Feb. 18, 1964   N. A. BORGLIN ETAL   3,121,652
TIRE BUILDING MACHINES WITH EXPANSIBLE TIRE BUILDING DRUM
Filed Feb. 3, 1961   7 Sheets-Sheet 1

INVENTORS
NILS A. BORGLIN and ANDERS M. E. APPELGREN
BY Winderoth, Lind & Ponack
ATTORNEYS

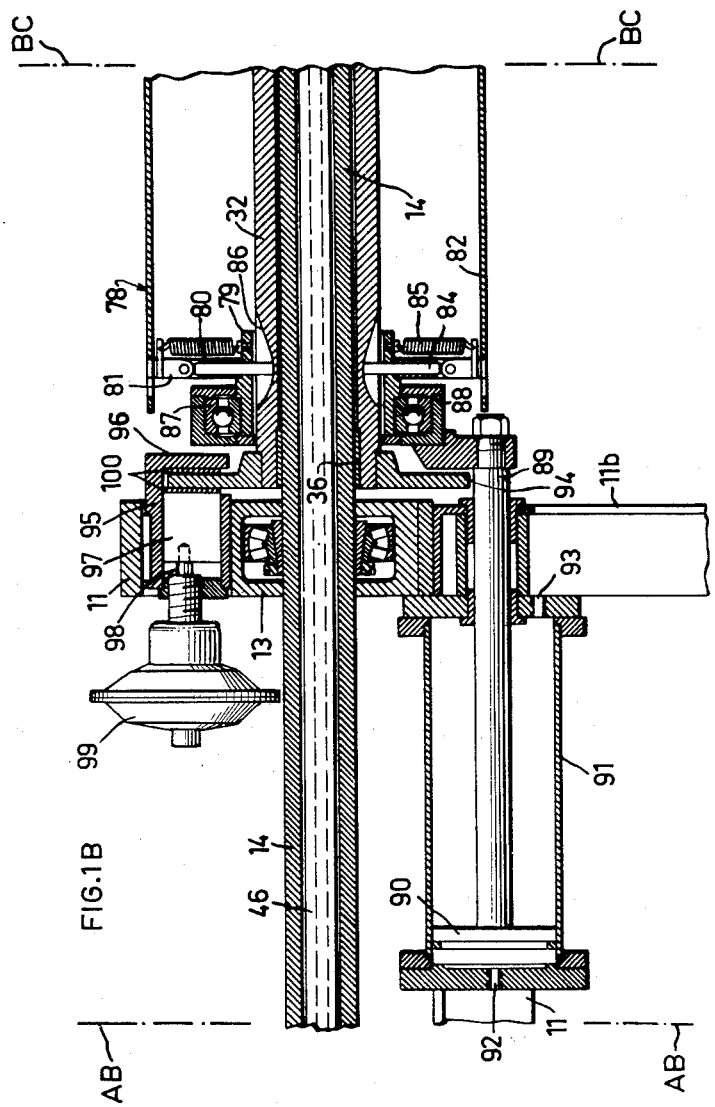

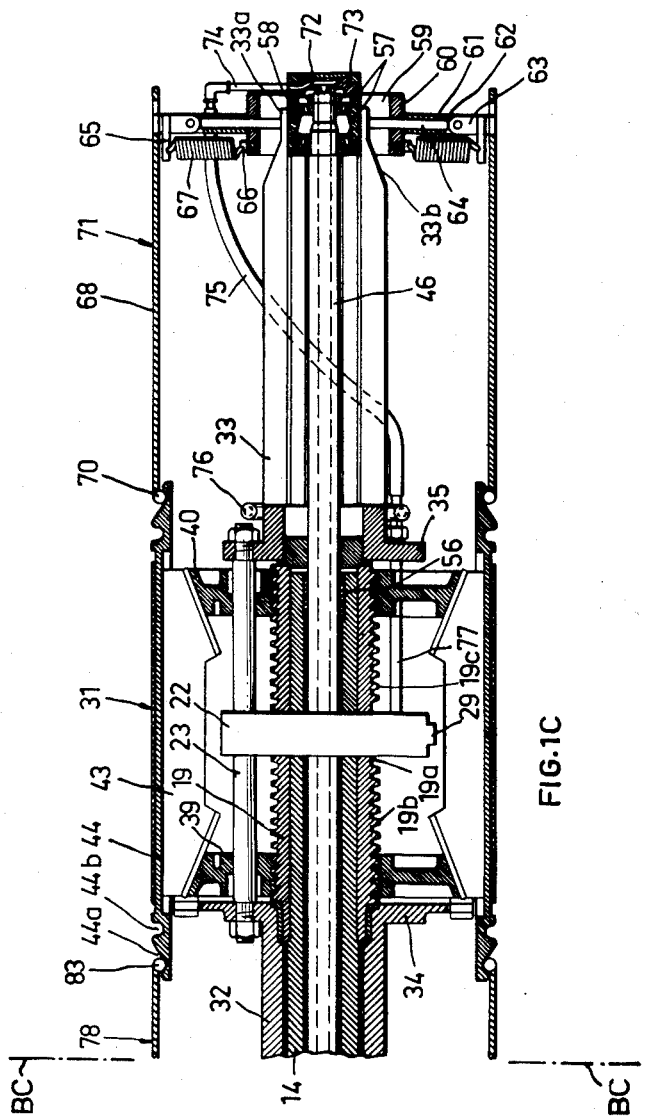

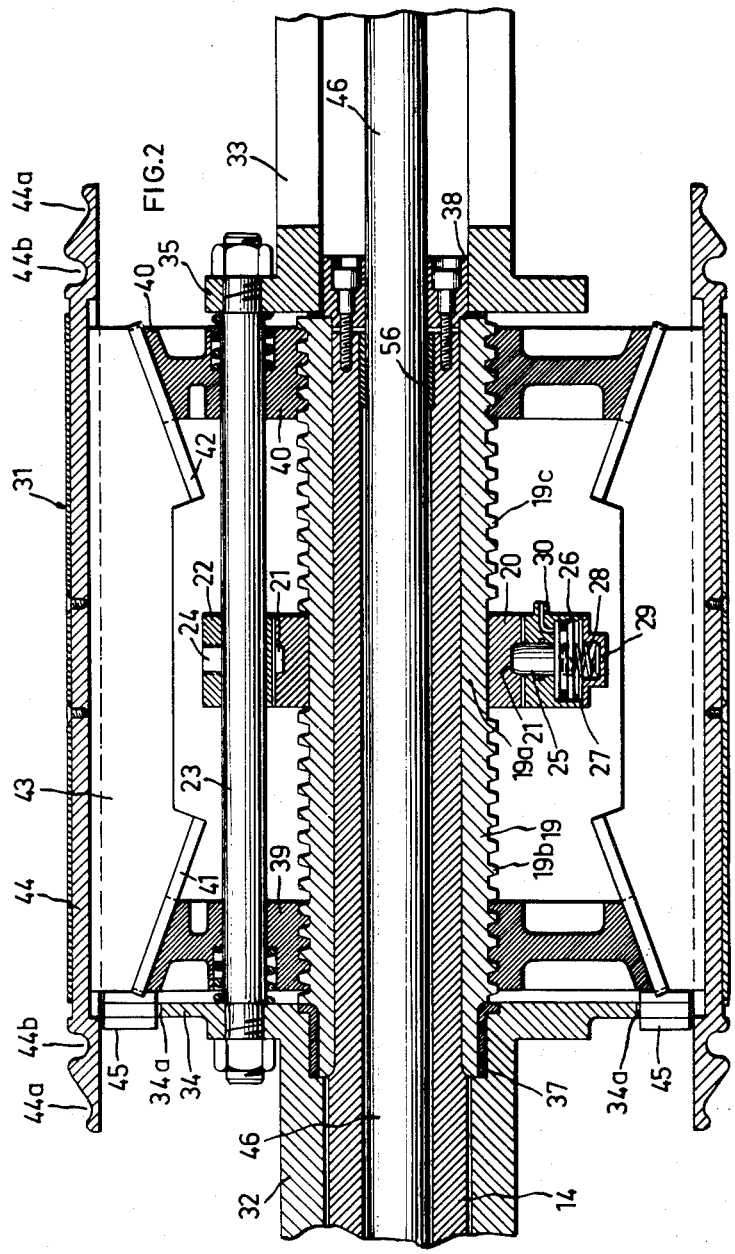

Feb. 18, 1964 N. A. BORGLIN ETAL 3,121,652
TIRE BUILDING MACHINES WITH EXPANSIBLE TIRE BUILDING DRUM
Filed Feb. 3, 1961 7 Sheets-Sheet 6

INVENTORS
NILS A. BORGLIN and ANDERS M.E. APPELGREN
By Winsroth, Lind & Ponack
ATTORNEYS INVENTORS
NILS A. BORGLIN and ANDERS M. E. APPELGREN

ATTORNEYS

United States Patent Office 3,121,652
Patented Feb. 18, 1964

3,121,652
TIRE BUILDING MACHINES WITH EXPANSIBLE
TIRE BUILDING DRUM
Nils Axel Borglin and Anders Mats Erik Appelgren,
Trelleborg, Sweden, assignors to Trelleborgs Gummi-
fabriks Aktiebolag, Trelleborg, Sweden, a corporation
of Sweden
Filed Feb. 3, 1961, Ser. No. 87,039
Claims priority, application Sweden Feb. 9, 1960
3 Claims. (Cl. 156—400)

This invention relates to tire building machines with an expansible tire building drum carried by a shaft laterally extending from a frame and with two tire ply fabric folding or turnover drums disposed coaxially with the tire building drum on either side thereof, and shifting means for telescopically moving said fabric turnover drums inwards over the tire building drum for turning the marginal portions of cord fabric plies wrapped around the three drums over bead wire rings which have been placed around the cord fabric plies adjacent the ends of the tire building drum.

In previously known tire building machines of this type the fabric turnover drum remote from the frame and the cooperating shifting means have been mounted with the aid of supporting means at the end of the drum remote from the frame of the shaft carrying the tire building drum so that the respective fabric turnover drum had to be pushed or swung away from the tire building drum to permit mounting prefabricated bead wire rings on the tire building drum and to permit removal of a finished tire from the machine. To push or swing a fabric turnover drum aside in such a way is a time-consuming operation which makes for a bulky, and usually also complicated and expensive construction. Also, the bead wire mounting means, if such are used, will be of expensive and complicated construction since these bead wire mounting means must be able to move both radially and axially relative to the tire building machine.

The present invention eliminates these disadvantages by an arrangement in which the shaft carrying the tire building drum is tubular and a push rod operable by the shifting means mounted on the frame or one of these shifting means extends through the shaft and is coupled to the fabric turnover drum remote from the frame in such a way as to carry along said drum axially. By this arrangement the drum assembly composed of the two fabric turnover drums and the tire building drum will extend freely in cantilever fashion from one side of the frame, thus having one end freely accessible as in tire building machines of another type with a non-expansible tire building drum, so that the prefabricated bead wire rings can, without difficulty, be passed onto the drum assembly from the free end thereof and the finished tire can be removed over said free end of the drum assembly.

For a better understanding the invention will be described more in detail in the following reference being made to the accompanying drawings which illustrate an embodiment of the invention. In the drawings:

FIGS. 1A, 1B and 1C together show a vertical section of a tire building machine according to the invention, FIGS. 1A and 1B connecting to each other on the dash and dot line AB and FIGS. 1B and 1C on the dash and dot line BC;

FIG. 2 shows a vertical section through a tire building drum, on a larger scale;

Figure 1A:
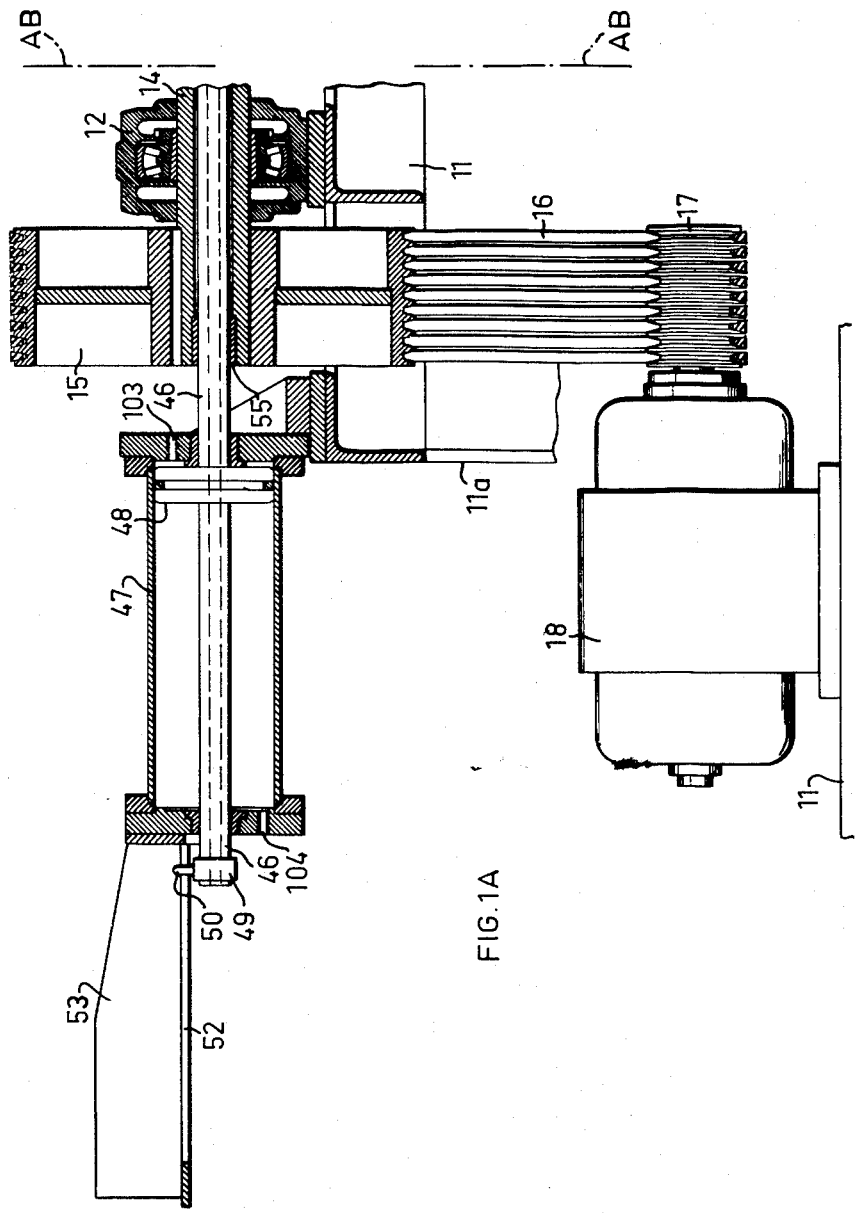

FIGS. 7–10 diagrammatically show different stages of the building of a tire in the machine.

The tire building machine illustrated in the drawings comprises a frame generally designated 11 and two end walls 11a and 11b. The machine frame can be of any construction whatever although it is shown in the drawings substantially as an angle-iron framework. The machine frame 11 supports two roller bearings 12, 13 rotatably mounting a tubular shaft 14 on the frame. One end of the shaft 14 extends laterally from the frame end wall 11b, and secured to the other end of the shaft is a pulley 15 which is connected by V-belts 16 to the pulley 17 of a drive motor 18 on said frame 11, by means of which the shaft 14 can be rotated.

Non-rotatably secured to the end of the shaft 14 extending from the frame end wall 11b is a sleeve 19 which has a central portion 19a with a smooth outer side. On either side of the central portion 19a the sleeve 19 has external threads 19b and 19c which are opposite in direction. Non-rotatably secured to the portion 19a is a locking ring 20 which has a plurality of locking recesses 21 evenly distributed around the outer cylindrical circumference of the ring 20. The locking ring 20 is surrounded by a locking ring 22 which is rotatable relative to the first locking ring 20 and secured by setscrews 24 to rods 23 extending through said second ring 22. Although but one rod 23 is shown in FIGS. 1C and 2, the embodiment illustrated has three rods distributed around the shaft 14 at a spacing of 120°. For locking the ring 22 and thereby the rods 23 to the ring 20 and consequently the shaft 14 at least one locking pin 25 is mounted in said second ring 22. Said locking pin 25 can be caused to engage in any one of the locking recesses 21 in said first ring 20. When three rods 23 are provided there are preferably also three locking pins 25 mounted in the second ring 22 between said rods. Each locking pin 25 is fixed to a piston 26 which is movable in a cylinder 27 in the locking ring 22. A pressure spring 28 interposed between the piston 26 and a cylinder cover 29 tends to urge the locking pin 25 into engagement with a locking recess 21 in the first ring 20. By supply of air under pressure or other pressure medium through a pipe connection 30 to the radially inner end of the cylinder 27 the piston 26 can be moved radially outwards against the action of the spring 28 to withdraw between the pin 25 from the locking recess 21 so that the shaft 14 can be rotated without carrying along the locking ring 22 and the rods 23.

The locking ring 22 and the rods 23 are parts of a hub structure for an expansible tire building drum generally designated 31 and to be described more in detail in the following. This hub structure includes two sleeves 32 and 33 which extend coaxially from the drum ends and the facing ends of which have end flanges 34 and 35 respectively. These end flanges 34 and 35 are fixedly connected with each other and with the locking ring 22 by means of the rods 23 in the manner apparent from FIGS. 1C and 2. The sleeve 32 is rotatably mounted on the shaft 14 by a bushing 36 and on the sleeve 19 by a bushing 37. In proximity to the end flange 35 the sleeve 33 is rotatably mounted on a bearing member 38 but otherwise of the cantilever type. The bearing member 38 is secured to the end of the shaft 14 by screws and simultaneously serves to retain the sleeve 19 on the shaft 14.

Engaging with the threads 19b and 19c of the sleeve 19 are two guide means 39, 40 which are displaceable on the rods 23 and have guide grooves of dovetail cross section in an oblique position to the axis of the shaft 14 and the adjacent ends of which are closest to the shaft 14. Guide ribs 41 and 42 are arranged in a corresponding oblique position on bars 43 and movably engage in the guide grooves of said guide means 39, 40. On each of said bars 43 there is fixed a merely diagrammatically indicated segment 44 of prior-art construction. For greater clarity the contours of the successive segments 44 and bars 43 behind the plane of the section have not been shown in FIGS. 1C and 2; however, in the embodiment illustrated there are eight bars 43 and segments 44. The axially directed segments 44 in a manner known at each end have a shallow channel 44a and a deep channel 44b for a purpose to be described in the following. The segments 44 together form an expansible tire building drum which has its smallest diameter when the guide means 39, 40 are most remote from each other, as is shown in FIGS. 1C and 2. By rotation of the shaft 14 in the manner described in the following in relation to the guide means 39, 40 said means can be screwed towards the locking ring 20 due to the threads 19b and 19c. During this movement the guide ribs 41, 42 of the bars 43 will slide in the grooves of the guide means 39, 40, while the segments 44 are moved radially away from the shaft 14 so that the diameter of the tire building drum increases. During their movement the bars 43 are also guided in that guide means 45 on the one ends of the bars engage in radial guide grooves 34a in the end flange 34 of the sleeve 32 and with the two lateral surfaces of the flange 34 so that they can move radially relative to the shaft 14 but are prevented from moving axially of the shaft 14.

A tubular push rod 46 is axially movable in the tubular shaft 14. One end of the push rod 46 projects through the end of the shaft 14 in the machine frame (FIG. 1A) and extends displaceably through the end walls of a pressure medium cylinder, e.g. a compressed-air cylinder 47, which is secured to the frame 11. In the cylinder 47 the rod 46 is fixedly connected to a piston 48 movable in said cylinder, the push rod 46 thus forming the piston rod. The free end of the rod 46 extending from the cylinder 47 carries a ring 49 which is fixedly connected thereto and from which a pin 50 projects. Said pin 50 is movable in a guide slot 52 in a bracket 53 secured to the cylinder 47. The piston rod 46 is mounted for rotation in the shaft 14 by means of bushings 55 (FIG. 1A) and 56 (FIG. 1C) and the pin 50 engaging in the guide slot 52 prevents the piston rod 46 taking part in the rotation of the shaft 14.

Figure 3:
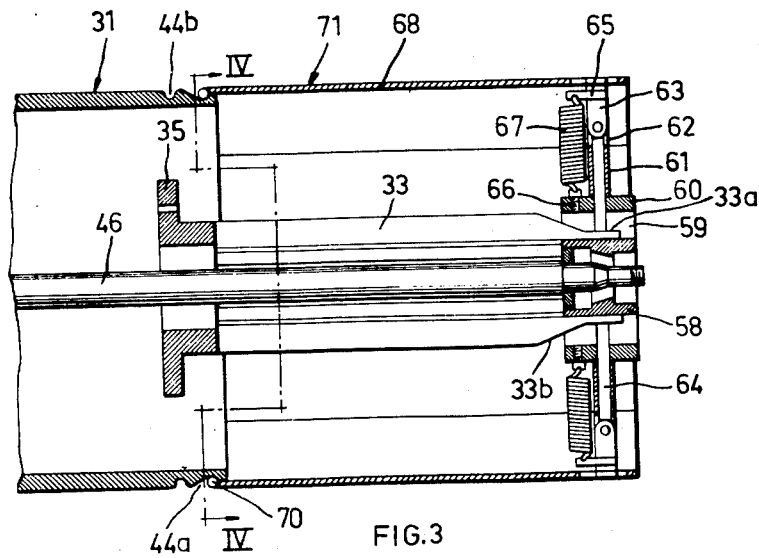
FIG. 3 shows a vertical section of a fabric turnover drum, on a larger scale.
Figure 5:
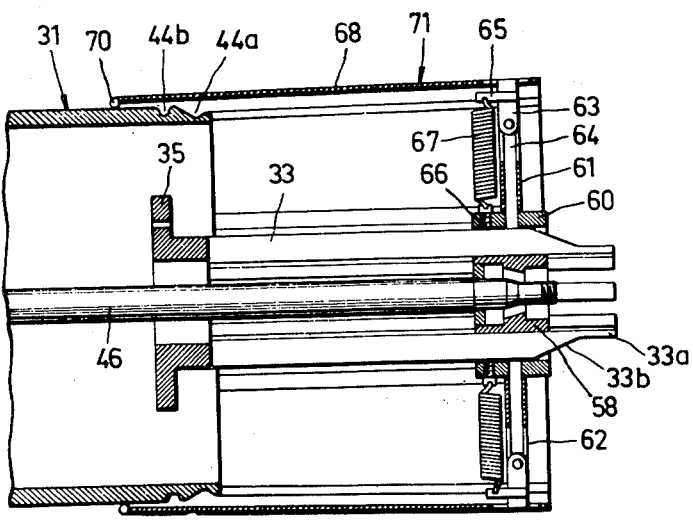
FIG. 5 shows a vertical section corresponding to FIG. 3, but with the fabric turnover drum partly telescoped inwards over the tire building drum.
Figure 4:
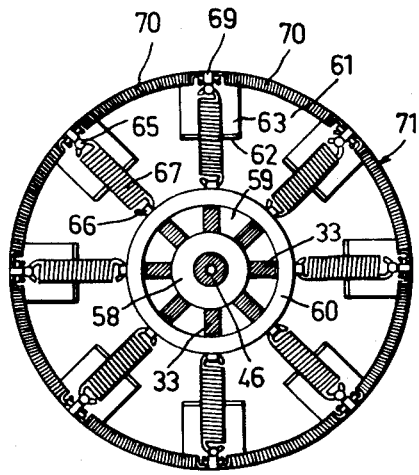
FIG. 4 shows a section on line IV—IV in FIG. 3.
Figure 6:
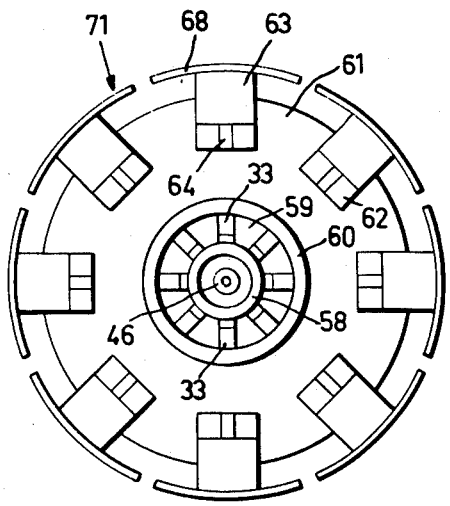
FIG. 6 shows the fabric turnover drum as seen from the right in FIG. 5.

The opposite end of the piston rod 46 from the piston 48 extends from the shaft 14 through the bearing member 38 and freely extends through the sleeve 33 which outside the bearing member 38 is divided into eight arms by axial slots. On the last-mentioned end of the piston rod 46 is rotatably mounted a hub 58 for a fabric turnover drum generally designated 71 by means of two roller bearings (FIG. 1C, omitted in FIGS. 3 and 5 for greater clarity). The hub 58 is movable in the space inside the eight arms of the sleeve 33 and has eight arms 59 which extend through the slots between the sleeve arms and outside said arms carry a ring 60 which supports a substantially circular disk 61 forming the body of the fabric turnover drum 71. Provided in the circumference of the disk 61 are eight guide slots 62 in which eight slides 63 are radially movable. The radially inner ends of said slides 63 are hingedly connected each to one cam follower 64 which is radially movably mounted in the disk 61 and the ring 60. A spring 67 tending to hold the cam follower 64 engaged with the outside of the respective arm of the sleeve 33, is interposed between a pin 65 on each slide 63 and a pin on the ring 60. The outer end of each slide 63 is connected at one end with a sheet metal segment 68, and the eight segments 68 together constitute the shell of the fabric turnover drum 71. At the end opposed to the slides 63 each segment 68 has a pivot bearing 69 for anchoring the facing ends of two prior-art stitcher springs 70 while permitting rotation of said ends. The eight stitcher springs 70 thus connect the drum shell segments 68 resiliently together and the segments 68 rest with said springs 70 on the shell of the tire building drum 31. When the piston rod 46 occupies the position shown in FIGS. 1A, 1B, 1C and 3, in which position the hub 58 of the fabric turnover drum 71 is at the free end of the sleeve 33, the stitcher springs 70 rest in one shallow channel 44a in the shell of the tire building drum 31. When the piston rod 46 moves to the left as seen in FIGS. 1C and 3 the hub 58 and thus the entire fabric turnover drum 71 is carried along the stitcher springs 70 rolling inwards over the shell of the tire building drum 31 (or, as will be described in the following, over the plies wrapped around said drum). An intermediate stage of such a shifting movement is shown in FIGS. 5 and 6. In the initial position according to FIGS. 1C, 3 and 4 the inner ends of the cam followers 64 are supported on narrow end portions 33a of the arms of the sleeve 33 so that the slides 63 are almost entirely drawn into the guide slots 62 in the disk 61 and the shell of the fabric turnover drum 71 formed by the segments 68 has substantially the same outer diameter as the shell of the tire building drum 31 occupying collapsed position according to FIGS. 1C and 2. At the beginning of the telescoping movement of the fabric turnover drum 71 inwards over the tire building drum 31 the inner ends of the cam followers 64 slide in an upward direction on inclined portions or ramps 33b of the arms of the sleeve 33 so that the slides 63 are moved radially outwards whereby the segments 68 of the fabric turnover drum 71 are moved apart until the fabric turnover drum 71 has obtained a slightly larger outer diameter than the shell of the expanded tire building drum 31, as will appear from FIGS. 5 and 6.

The end of the tubular piston rod 46 extending from the cylinder 47 (FIG. 1A) is connectible to a source (not shown) of air under pressure or other pressure medium which is conveyed by the piston rod 46 to a chamber 72 (FIG. 1C) in a cover assembly 73 for the hub 58 of the fabric turnover drum 71. Said cover assembly 73 and the piping described in the following are shown only in FIG. 1C, they have been omitted from FIGS. 2–6 for greater clarity. Extending from the chamber 72 of the cover assembly 73 is an axially directed pipe 74 which in the interior of the fabric turnover drum 71 is connected by means of a hose 75 to an annular manifold 76 surrounding the sleeve 33 and connected by pipes 77 to the pipe connections 30 of the three locking cylinders 27 (FIGS. 1C and 2). By supply of pressure medium to the tubular piston rod 46 the engagement between the locking ring 22 of the tire building drum 31 and the locking ring 20 secured to the sleeve 19 of the shaft 14 can thus be broken. When the locking rings 20 and 22 are locked together, the tire building drum 31 can be rotated by the motor 18, and the fabric turnover drum 71 is carried along in this rotation by the arms of the sleeve 33 engaging the hub arms 59 of the fabric turnover drum 71. By said engagement between the arms of the sleeve 33 and the arms 59 of the hub 58 the fabric turnover drum 71 is always non-rotatably coupled to the tire building drum 31.

A fabric turnover drum generally designated 78 and fully corresponding to the earlier described fabric turnover drum 71 except for its hub construction is movably but non-rotatably mounted on the sleeve 32 between the tire building drum 31 and the frame end wall 11b. The hub of the drum 78 is constituted by a ring 79 which is movable on, but kept nonrotatable relative to, the sleeve 32 by pins (not shown for greater clarity of the drawings) which from the inner side of the ring 79 engage in axial guide grooves in the outer side of the sleeve 32. A substantially circular disk 80 of the same construction as the disk 61 of the fabric turnover drum 71 is secured to the ring 79 and in recesses provided in the circumference of the disk 80 slides 81 are radially movable. Said slides correspond to the earlier described slides 63 of the fabric turnover drum 71. The slides 81 are connected to the one ends of segments 82 forming the shell of the fabric turnover drum 78, and the other ends of said segments 82 bear against the tire building drum 31 with stitcher springs 83—all in conformity with that earlier described in connection with the fabric turnover drum 71. The slides 81 are hingedly connected to cam followers 84 mounted in the disk 80 and held pressed like the cam followers 64 of the fabric turnover drum 71 against the sleeve 32 by springs 85. In the initial position shown in FIGS. 1B and 1C the cam followers 84 are held against the deepest portion of grooves 86 in the sleeve 32 so that the outer diameter of the fabric turnover drum 78 substantially corresponds to the outer diameter of the tire building drum 31 occupying collapsed position. The fabric turnover drum 78 can be telescoped inwards over the tire building drum 31 in the manner described in the following, and at the beginning of this movement the cam followers 84 slide out of the grooves 86 onto the outer circumferential surface of the sleeve 32, the fabric turnover drum 78 being expanded in the same way as the fabric turnover drum 71 to an outer diameter slightly greater than the outer diameter of the tire building drum 31 occupying expanded position.

To permit displacement of the fabric turnover drum 78 the hub ring 79 thereof carries a ball bearing 87 by means of which an annular dog 88 is rotatably but axially non-movably connected to the fabric turnover drum 78. The annular dog 88 is fixedly connected to a piston rod 89, the piston 90 of which is movable in a cylinder 91 for air under pressure or other pressure medium, mounted on the frame 11. By admission of pressure medium to one or the other end of the cylinder 91 through connection apertures 92, 93 the fabric turnover drum 78 can thus be moved in one or the other direction on the sleeve 32.

For retaining the drums 31, 71 and 78 against rotation relative to the frame 11 the sleeve 32 is provided, between the annular dog 88 and the frame end wall 11b, with a brake disk 94 which is secured to the end of the sleeve and the marginal portion of which is clamped by a friction brake. This brake consists of a body 95 which is non-rotatable but movable in the frame 11 toward and away from the fabric turnover drum 78, said body having a hold-up jaw 96 extending into the space between the brake disk 94 and the fabric turnover drum 78. A brake shoe 97 is movable in said body 95 toward and away from the brake disk 94 by the action of an operating rod 98 which is secured to a diaphragm in a hydraulic or pneumatic control apparatus 99 of a previously known type which is connectible to a source of pressure medium (not shown). Both the hold-up jaw 96 and the brake shoe 97 may have a brake lining 100 to increase the friction against the disk 94. By means of the control apparatus 99 the brake disk 94 can thus be clamped between the brake shoe 97 and the jaw 96 so that it is held to the frame against rotation. The sleeve 32 and the tire building drum 31 are thus locked. The hub ring 79 being non-rotatably connected to the sleeve 32, the fabric turnover drum 78 also is locked. The sleeve 32 being non-rotatably connected to the sleeve 33 by means of the rods 23, and the arms of said sleeve engaging the arms 59 of the hub 50, the fabric turnover drum 71 also is locked.

Figure 7:
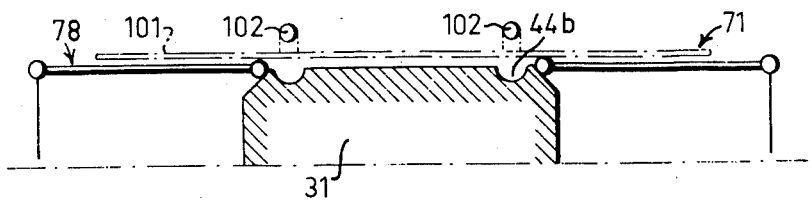

When a tire is to be built in the machine described in the foregoing, the parts first occupy the position shown in FIGS. 1A–1C i.e. the tire building drum 31 and the fabric turnover drums 71, 78 are collapsed to their smallest diameter and connected by the locking mechanism 20, 22 to the motor-driven shaft 14, the brake 95—100 being released. During rotation of the drums 31, 71 and 78 for instance, two plies of cord fabric are first wrapped around the drums, said cord being of such a width as to cover the entire tire building drum 31 and, with its marginal portions, also part of each fabric turnover drum 71, 78. In FIG. 7 the cord fabric plies are indicated by dotted lines 101. Then two prefabricated bead wire rings 102 (FIG. 7) are passed over the free end of the fabric turnover drum 71 and moved in over the tire building drum 31 to a position opposite their respective grooves 44b in the shell of the tire building drum 31. Although the mounting of the bead wire rings can be done by hand the use of a special apparatus for this purpose is recommended. The previously known bead wire mounting apparatuses may be used although their construction may be simplified since they need not move the bead wire rings at right angles to, but only along, the axis of the drums 31, 71, 78.

Figure 8:
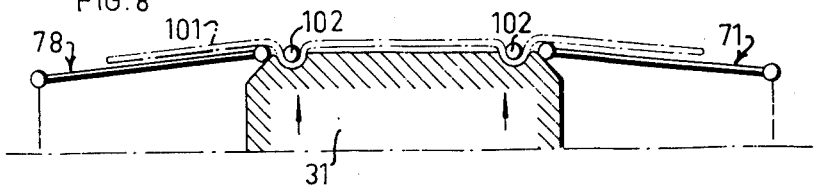
Figure 9:
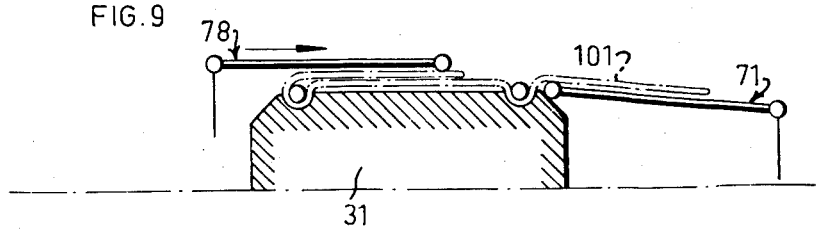
Figure 10:
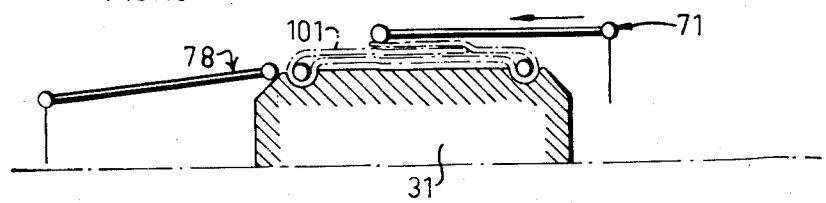

After the wire bead rings 102—the inner diameter of which is slightly larger than the outer diameter of the plies 101 wrapped around the drums—have been brought into position opposite the respective grooves 44b in the tire building drum 31, pressure medium is supplied to the cylinders 27 of the locking mechanism through the piston rod 46 and the pipings 74—77 so that the locking pins 25 are disengaged from the locking ring 20 and the drums 31, 71, 78 are thereby released from the shaft 14. At the same time the brake 95—100 is supplied with pressure medium so that the disk 94 and thus the drums 31, 71, 78 are braked and held against the frame 11. The motor 18 is now caused to rotate the shaft 14 in such a direction that the guide means 39, 40 are moved towards one another under expansion of the tire building drum 31. During this expansion the plies 101 are moved towards the wire bead rings 102 which consequently penetrate into the grooves 44b in the tire building drum. This stage is illustrated in FIG. 8. The bead wire rings 102 are not resilient and therefore limit the expansion of the drum 31. After sufficient expansion of the tire building drum 31, pressure medium is withdrawn from the cylinders 27 of the locking mechanism so that said mechanism again connects the drums 31, 71, 78 with the shaft 40 thus retaining the drum 31 in the expanded state. The brake 95—100 is also released. Pressure medium is then supplied to the cylinder 91 through the connection aperture 92. This will cause the piston 90 to telescope the fabric turnover drum 78 inwards over the tire building drum 31, the stitcher springs 83 rolling out of the grooves 44a in the tire building drum 31 and inwards over the plies on said drum. As a consequence, the marginal portion of the plates 101 positioned from the beginning on the drum 78 is turned over the wire bead ring 102 adjacent the fabric turnover drum 78 and inwards over the intermediate portion of the plies between the bead wire rings, as is shown in FIG. 9. During its movement the drum 78 is simultaneously expanded in the manner already described so that the stitcher springs 83 all the time can roll on the plies on the tire building drum 31, pressing the turned-over marginal portion of the plies against the intermediate portion of the plies between the bead wire rings. After the turning-over has been completed, the fabric turnover drum 78 is returned to initial position by admission of pressure medium to the cylinder 91 through the aperture 93. At the same time pressure medium is supplied to the cylinder 47 through the connection aperture 103 so that the fabric turnover drum 71 is caused to telescope inwards over the tire building drum 31, whereby the other marginal portion of the plies 101 is turned over the adjacent bead wire ring 102 and pressed against the other maginal portion of the plies between the bead wire rings as is indicated in FIG. 10. After the turning-over has been completed the fabric turnover drum 71 is returned to its initial position by admission of pressure medium to the cylinder 47 through the connection aperture 104. The building of the tires on the tire building drum 31 is then terminated in the ordinary manner by wrapping rubber strips forming the tread and other parts of the tire onto the tire building drum 31. Finally, the brake 95—100 is caused to lock the drums 31, 71, 78 to the frame 11 while air under pressure is supplied to the locking mechanism 20, 22 for the release of the drums from the shaft 14 so that the tire building drum 31 can be collapsed to its smallest diameter by rotation of the shaft 14 by the motor 18. After the collapsing of the tire building drum 31, the finished tire is easily removed from the machine over the free end of the drum 71.

What we claim and desire to secure by Letters Patent is:

1. In a tire building machine, the combination of a frame, a rotatable tubular shaft extending laterally from said frame in a cantilever fashion, an expansible tire building drum, hub means on said shaft laterally of said frame on which hub means said tire building drum is supported, a slotted sleeve extending from said hub means and said tire building drum on the side of said drum remote from said frame and coaxially with said shaft, a reciprocable rod extending from said frame coaxially through said shaft and said sleeve, shifting means on said frame and connected to said rod for reciprocating said rod longitudinally, an expansible tire ply fabric turnover drum surrounding said sleeve, mounting means on said rod extending through at least one slot in said slotted sleeve and connecting said turnover drum and said rod for concomitant axial reciprocation, internal expansion means for said turnover drum located within said turnover drum adjacent its end remote from said frame and said tire building drum, cam follower means within said turnover drum cooperating with said expansion means for operating said expansion means, and cam means on said sleeve cooperating with said cam follower means, whereby when said turnover drum is moved by said shifting means and said rod towards said tire building drum, said turnover drum is expanded and moved telescopically over said tire building drum.

2. The combination as claimed in claim 1, in which said mounting means for rotatably supporting said turnover drum on said rod comprises bearing means between said rod and said slotted sleeve.

3. In a tire building machine, the combination of a frame, a rotatable tubular shaft extending laterally from said frame in a cantilever fashion, an expansible tire building drum, hub means on said shaft laterally of said frame on which hub means said tire building drum is supported, a slotted sleeve extending from said hub means and said tire building drum on the side of said drum remote from said frame and coaxially with said shaft, a reciprocable rod extending from said frame coaxially through said shaft and said sleeve, shifting means on said frame and connected to said rod for reciprocating said rod longitudinally, an expansible tire ply fabric turnover drum surrounding said sleeve, stitching means on said turnover drum at the end thereof adjacent said tire building drum and supporting that end on said tire building drum, mounting means on said rod extending through at least one slot in said slotted sleeve and connecting said turnover drum and said rod for concomitant axial reciprocation, internal expansion means for said turnover drum located within said turnover drum adjacent its end remote from said frame and said tire building drum, cam follower rods within said turnover drum and operating said expansion means and extending radially of said turnover drum and mounted for reciprocation in the longitudinal direction of said cam follower rods in said mounting means, and external cam surfaces on said sleeve cooperating with said cam follower rods, whereby, when said turnover drum is moved by said shifting means and said rod towards said tire building drum, said turnover drum is expanded and moved telescopically over said tire building drum.

References Cited in the file of this patent

UNITED STATES PATENTS

| | | |
|---|---|---|
| 1,759,232 | Gammeter | May 20, 1930 |
| 2,313,035 | Breth | Mar. 9, 1943 |
| 2,565,071 | Frazier | Aug. 21, 1951 |
| 2,715,933 | Frazier | Aug. 23, 1955 |
| 2,743,760 | Beckadolph | May 1, 1956 |
| 2,838,091 | Kraft | June 10, 1958 |
| 3,075,570 | Garrer | Jan. 29, 1963 |